(12) United States Patent
Ahn

(10) Patent No.: US 7,016,287 B2
(45) Date of Patent: Mar. 21, 2006

(54) METHOD AND APPARATUS OF MODULATING/DEMODULATING DATA FOR AN OPTICAL RECORDING MEDIUM

(75) Inventor: Seong Keun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 319 days.

(21) Appl. No.: 10/066,663

(22) Filed: Feb. 6, 2002

(65) Prior Publication Data

US 2002/0159367 A1    Oct. 31, 2002

(30) Foreign Application Priority Data

Feb. 6, 2001    (KR) .................................. 2001-5533

(51) Int. Cl.
   *G11B 5/09*    (2006.01)
(52) U.S. Cl. ................... 369/59.24; 369/124.04
(58) Field of Classification Search ............. 369/47.16, 369/47.17, 47.19, 47.23, 47.24, 53.31, 53.33, 369/59.23, 59.24, 124.04
See application file for complete search history.

(56) References Cited

U.S. PATENT DOCUMENTS

| 5,638,064 | A | * | 6/1997 | Mori et al. .................... 341/58 |
| 5,923,629 | A | * | 7/1999 | Noxon et al. ................. 360/41 |
| 6,014,094 | A | * | 1/2000 | Hayashiyama et al. ....... 341/58 |
| 6,195,778 | B1 | * | 2/2001 | Tran ........................... 714/752 |

* cited by examiner

*Primary Examiner*—Paul W. Huber
(74) *Attorney, Agent, or Firm*—Birch, Stewart, Kolasch & Birch, LLP

(57) ABSTRACT

The present invention relates to method and apparatus for suppressing a DC component of coded sequence with no additional bit for suppressing a DC component, and for decoding the coded sequence. The present modulating method includes modulating the source data to a coded data based on at least one mapping table, the mapping table including a first table and a second table containing coded data corresponding to the source data, the first table being a 2/3 table containing 3-bit coded data for 2-bit source data, and the second table being a 4/6 table containing 6-bit coded data for 4-bit source data, wherein one of the first table and the second table is selected according to a bit sequence of the source data; and recording the coded data onto the optical recording medium.

26 Claims, 2 Drawing Sheets

METHOD AND APPARATUS OF MODULATING/DEMODULATING DATA FOR AN OPTICAL RECORDING MEDIUM

BACKGROUND OF THE INVENTION

1. Field of the Invention

The present invention relates to data modulating/demodulating method and apparatus, and more particularly, to method and apparatus for suppressing a direct-current (DC) component of coded sequence with no additional bit for suppressing a DC component, and for decoding the coded sequence.

2. Description of the Related Art

In these days, an optical recording medium is widely and successfully used for storing various information such as video and audio signals. An optical recording medium is classified into two types 'read-only' one such as CD-ROM and DVD-ROM, and 'writable' type such as CD-R, DVD-R, CD-R/W, and DVD-RAM.

When data is written to a conventional writable optical recording medium, the data is modulated into code matching the recording medium prior to the recording in order to stabilize a servo mechanism in data recording and to stabilize a reproducing clock in data reproduction. Such modulation must satisfy the following constraints: code efficiency is high; a reproducing clock is stable; jitter margin for detecting data stably is ensured; a DC component or digital sum value (DSV) is minimized enough to stabilize data detection and tracking servo; no or the least error propagation arises; and code words have fewer bits as possible as they can.

EFM (Eight-to-Fourteen Modulation) is used for CD series and EFM+ (called 'EFM plus') is used for DVD series. Owing to these two modulations, data having high-frequency components is converted to lower frequency signals, which will induce stabilization of servo mechanism.

In EFM, one byte, namely, 8 bits are coded to 17-bit symbol data including 3-bit merging bits, and, in EFM+, 8 bits are coded to a 16-bit modulated word depending upon a previous state. The coded data is then converted to NRZI (Non-Return to Zero Inverted) unit which will be written to a writable disk in marks and edges. The distance between successive edges is limited by the rule of RLL (Run Length Limitation), generically designated as RLL(d,k), which means having constraints that at least d 'zeros' are recorded between successive 'ones', and that no more than k 'zeros' are recorded between successive 'ones'. The first constraint arises to obviate intersymbol interference occurring because of pulse crowding of the reproduced ones, which mean transitions, namely ones when a series of 'ones' are contiguously recorded. The second constraint arises to ensure recovering a clock from the reproduced data by locking a PLL to the reproduced transitions.

For example, in RLL (2,10) used for DVD series, at least two 'zeros' are placed between recorded 'ones', and no more than ten contiguous 'zeros' are placed between recorded 'ones'. Therefore, after NRZI conversion, minimum run length time is (d+1)T and maximum run length time is (k+1)T where T is a channel bit interval. That is, for the example of a (2,10) code, the run length time ranges from 3T to 11 T inclusive.

In general, data modulation may use a fixed block scheme in which source data is one-to-one mapped to corresponding modulated data with reference to a conversion table. For this mapping, there is a single conversion table for CD series containing 256 (0 to 255) 16-bit code words whereas there are four sets of main conversion tables and four sets of sub-tables for DVD series. Each main table contains 256 16-bit code words and each sub-table contains 88 (0 to 87) 16-bit code words. However, in the fixed block scheme, the RLL constraints may be violated between two consecutive bytes under a given code rate even though each byte satisfies the RLL constraints. If the RLL constraints are violated between two successive bytes, one bit must be inserted therebetween. Moreover, one additional bit is added for DC balance. This additional bit for the DC balance demands another one bit to satisfy the given RLL constraints. Therefore, a total of three bits must be inserted if the given RLL constraints are violated between two successive bytes.

As described above, the fixed block scheme has an advantage of no conversion error because a source data is one-to-one mapped to the corresponding modulated data, whereas it has a drawback in that the recording density is somewhat limited because of a merging bit and additional bits which are necessary when the given RLL constraints are violated between two consecutive bytes.

In the modulation for DVD series, no need for additional bits arises because a previous mapping state is considered at the present mapping process. This modulation is called a 'look-ahead' scheme in comparison with the fixed block scheme. However, there are problems in that mapping algorithm is complicated and many tables are required. The look-ahead scheme is superior to the fixed block scheme in increasing storage capacity. In the look-ahead scheme, the modulation of a current data (symbol) is dependent on next data or previous data occasionally. The look-ahead scheme needs a simple algorithm and hardware and it requires only 2 bits for DC balance as well. Therefore, it can ensure higher storage capacity of a recording medium than the fixed block scheme.

However, the look-ahead scheme has a drawback in that if an error occurs in a certain data, it propagates to subsequent data because the modulation of a current data depends upon the next or previous data.

For a high-density writable optical recording medium, new modulating methods are being demanded to ensure stable jitter margin and to increase storage capacity. The new modulating methods have common tendencies in that the code rate is 2/3 to convert an 8-bit source data to a 12-bit code data and (1,7) or (1,8) code is used. In this case, DSV is minimized to stabilize data reproduction and servo mechanism.

When data is recorded onto a recording medium or transmitted through a transmission line, the data is modulated into a coded sequence matching the recording medium or the transmission line. If the coded sequence resulting from the modulation contains a DC component, a variety of error signals such as tracking errors generated in control of a servo mechanism of a disk drive become prone to variations. As a result, jitters of the error signals are generated severely.

Therefore, it is desirable to suppress low-frequency components of the coded sequence in order to make a servo irresponsible to low-frequency components. In order to prevent the modulated sequence from containing a DC component, control of DSV has been proposed. The DSV is an indicator of a DC component contained in a train of sequences, and it is a total found by adding up the values of a train of bits, wherein the values +1 and −1 are assigned to '1' and '0' in the train respectively, which results in after the NRZI modulation of a train of channel bits. For example, if a train of bits is "1001000" after the modulation, it is converted to "1110000" by the NRZI modulation. For this sequence, the DSV varies to 1, 2, 3, 2, 1, 0, and −1 sequentially bit by bit.

A substantially constant DSV means that the frequency spectrum of the signal does not comprise frequency components in the low frequency zone. The DSV control is accomplished by calculating a DSV of a train of encoded bits after an RLL(d,k) modulation for a predetermined period of time and inserting a predetermined number of DSV control bits into the train of encoded bits. In order to improve the code efficiency it is desirable to reduce the number of DSV control bits to a smallest possible value.

SUMMARY OF THE INVENTION

It is another object of the present invention to provide data modulation/demodulation method and apparatus, which overcome the problems and limitations associated with the related art.

It is an object of the present invention to provide data modulating/demodulating method and apparatus capable of suppressing a DC component of coded sequence with no additional bit for suppressing a DC component, and of decoding the coded data.

It is another object of the present invention to provide data modulating/demodulating method and apparatus capable of increasing a recording density while making a DSV substantially constant, or zero.

A method of modulating data to be written onto an optical recording medium in accordance with an aspect of the present invention comprises the steps of modulating a source data twice based on a first mapping table and a second mapping table wherein the first mapping table contains coded data corresponding to the source data and the second mapping table contains at least one coded data, capable of suppressing low frequency components, to which at least one source data among all source data contained in the first mapping table is mapped; and selecting one of the modulated data based on at least one among the conditions of the value of a previous source data, the time when low-frequency suppression has been conducted, the value of subsequent modulated data, and whether or not RLL constraints are violated.

A method of demodulating coded data read from an optical recording medium in accordance with an aspect of the present invention comprises the steps of reading a channel data from the optical recording medium, the channel data having been modulated from a source data using a table selected among a plurality of mapping tables based on at least one among the conditions of the value of a previous source data, the time when low-frequency suppression has been conducted, the value of subsequent modulated data, and whether or not RLL constraints are violated; and demodulating the read channel data using a plurality of de-mapping tables in which a decoded data corresponding to the channel data is contained.

An apparatus of modulating data to be written onto an optical recording medium in accordance with an aspect of the present invention comprises a modulator modulating a source data twice based on a first mapping table and a second mapping table wherein the first mapping table contains coded data corresponding to the source data and the second mapping table contains at least one coded data, capable of suppressing low frequency components, which at least one source data among all source data contained in the first mapping table is mapped to; and a controller selecting one of the modulated data based on at least one among the conditions of the value of the source data, the time when low-frequency suppression has been conducted, the value of subsequent modulated data, and whether or not RLL constraints are violated.

An apparatus of demodulating coded data read from an optical recording medium in accordance with an aspect of the present invention comprises a detector reading a channel data from the optical recording medium wherein the channel data having been modulated from a source data using a table selected among a plurality of mapping tables based on at least one among the conditions of the value of a previous source data, the time when low-frequency suppression has been conducted, the value of subsequent modulated data, and whether or not RLL constraints are violated; and a demodulator demodulating the read channel data using a plurality of de-mapping tables in which a decoded data corresponding to the channel data is contained.

The data modulating/demodulating method and apparatus for an optical recording medium in accordance with an aspect of the present invention uses a code rate of 2/3 and the RLL constraints of (1,8).

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENTS

Figure 1:
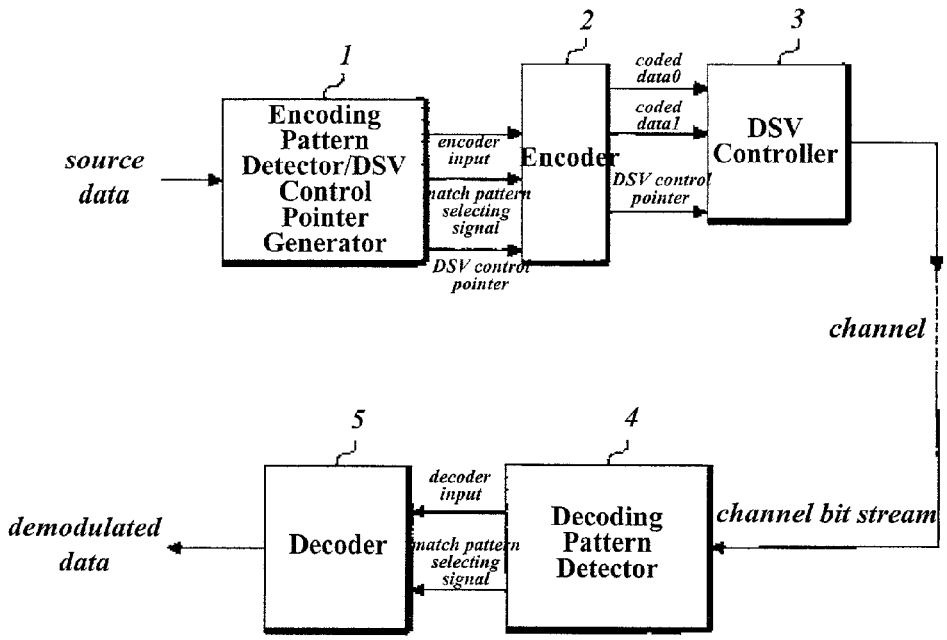
FIG. 1 is a block diagram of a data modulating/demodulating apparatus in accordance with the present invention.

The above objects and features of the present invention will be more apparent from the following description of the preferred embodiments with reference to the drawings.

Preferred embodiments of the present invention will now be described with reference to the accompanying drawings of FIGS. 1 to 4 and Tables 1 to 7.

For matching the RLL constraints to (1,8), a 3-bit code word is assigned for each 2-bit source word as given in Table 1 in consideration of constraints of d=1 and k=8.

TABLE 1

| Source Word | Code Word |
| --- | --- |
| 00 | 010 |
| 01 | 001 |

TABLE 1-continued

| Source Word | Code Word |
|---|---|
| 10 | 100 |
| 11 | 101 |

In the mapping rule of Table 1, if a source is "00", '1' is inserted between two zeros; if a source is "01", '0' is inserted between '0' and '1' in consideration of d constraint; and if a source is "10" or "11", '0' is inserted between '1' and '0' and between two ones, respectively.

For the source word "10" in Table 1, another code word can be assigned to suppress low-frequency components as given in Table 2.

TABLE 2

| Source Word | Code Word |
|---|---|
| 10 | 000 |

Even if a source word is "10", Table 2 for suppressing low-frequency components is not used on the following five conditions.

2-1) a source word or sequence before a current source word is "00", "01 00", "10" or "11", or low-frequency component suppression is conducted right before.

2-2) a source sequence "01 10" is modulated right before and a modulated code sequence (channel code) after a current source word is "101 010" or "001 010".

2-3) a source sequence "11 10" is modulated right before and a modulated code sequence (channel code) after a current source word is "001 000 010", "101 000 010" or "000 101 010".

2-4) a modulated code word after a current source word is "100" or "010".

2-5) the constraints of RLL (d,k) will be violated if Table 2 is used to modulate a source word to suppress low-frequency components.

If a current mapping state is not in the above five conditions, a source word "10" is mapped to "000" in accordance with Table 2 in order to suppress low-frequency components.

Table 3 is used for mapping a 4-bit source word to a 6-bit code word in consideration of RLL (1,8) constraints and coding efficiency of 2/3.

TABLE 3

| Source Word | Code Word |
|---|---|
| 01 10 | 000 010 |
| 01 11 | 001 000 |
| 11 10 | 000 100 |
| 11 11 | 101 000 |

Instead of 4/6 modulation table of Table 3, another table of Table 4 is used to modulate 4-bit source words "01 00" and "11 11" to suppress low-frequency components.

TABLE 4

| Source Word | Code Word |
|---|---|
| 01 00 | 010 000 |
| 11 11 | 100 000 |

Even if a current source word is "01 00", Table 4 for suppressing low-frequency components is not used on the following nine conditions in consideration of RLL (d,k) constraints.

4-11) low-frequency component suppression is conducted right before a current source word.

4-12) 6/9 modulation is conducted right before in accordance with Table 5 given below.

4-13) 8/12 modulation is conducted right before in accordance with Table 6 given below.

4-14) a source word "01 11" is modulated right before.

4-15) a source word "11" or "01 00" is modulated right before.

4-16) a source word "11 00" is modulated right before.

4-17) a source word "11 11" is modulated right before.

4-18) source words "01 00" and "00" are modulated right before.

4-19) a code word after a current source word is "100" or "010".

If a current mapping state is not in the above nine conditions, a source word "01 00" is mapped to "010 000" in accordance with Table 4 in order to suppress low-frequency components.

Even if a current source word is "11 11", Table 4 for suppressing low-frequency components is not used on the following eight conditions in consideration of RLL (d,k) constraints.

4-21) a code word after a current source word is "001 000 010", "000 100 010", or "000 101 010".

4-22) low-frequency component suppression is conducted right before.

4-23) 6/9 modulation is conducted right before in accordance with Table 5 given below.

4-24) 8/12 modulation is conducted right before in accordance with Table 6 given below.

4-25) a source word "00" is modulated right before and modulated code sequence after a current source word is "101 010" or "001 010".

4-26) a source word "01 10" is modulated right before and a modulated code sequence after a current source word is "101 010" or "001 010".

4-27) a code word after a current source word is "100" or "010".

4-28) a code sequence after a current source word is "000 010".

If a current mapping state is not in the above eight conditions, a source word "11 11" is mapped to "100 000" in accordance with Table 4 in order to suppress low-frequency components.

Table 5 is used for mapping a 6-bit source word to a 9-bit code word in consideration of RLL (1,8) constraints and coding efficiency of 2/3.

TABLE 5

| Source Word | Code Word |
|---|---|
| 10 01 10 ! (00 \| 10) | 001 010 000 |
| 11 01 10 ! (00 \| 10) | 101 010 000 |

In Table 5, the notation of '!(00|10)' means that a source word following the sequence "10 01 10" is NOT "00" or "10", namely, a source word following the sequence "10 01 10" is "01" or "11".

Table 6 is used for mapping a 8-bit source word to a 12-bit code word in consideration of RLL (1,8) constraints and coding efficiency of 2/3.

TABLE 6

| Source Word | Code Word |
| --- | --- |
| 01 01 10 00 | 001 000 010 000 |
| 01 01 10 10 | 001 010 010 000 |
| 11 01 10 00 | 101 010 010 000 |
| 11 01 10 10 | 101 000 010 000 |

Table 7 is used for mapping a 10-bit source word to a 15-bit code word in consideration of RLL(1,8) constraints and coding efficiency 2/3.

TABLE 7

| Source Word | Code Word |
| --- | --- |
| 01 01 10 00 00 | 001 000 000 101 010 |
| 01 01 10 00 10 | 010 100 000 101 010 |
| 01 01 10 10 00 | 010 100 000 001 010 |
| 01 01 10 10 10 | 001 000 000 001 010 |
| 11 01 10 00 00 | 100 000 001 000 010 |

FIGS. 1 to 4 show block diagrams of a data modulating/demodulating apparatus in accordance with an embodiment of the present invention.

The apparatus of FIG. 1 comprises an encoding pattern detector/DSV control pointer generator 1, an encoder 2, and a DSV controller 3 which are placed in series between a channel and an input line through which a train of source data in entered, all operatively coupled.

The encoding pattern detector/DSV control pointer generator 1 receives source data and stores it in a buffer (not shown). The stored source data is sent to the encoder 2 by the encoding pattern detector/DSV control pointer generator 1 together with both a match pattern selecting signal pointing out one among Tables 1 to 7 for mapping a source data and a DSV control pointer indicating whether to conduct DSV control.

Figure 2:
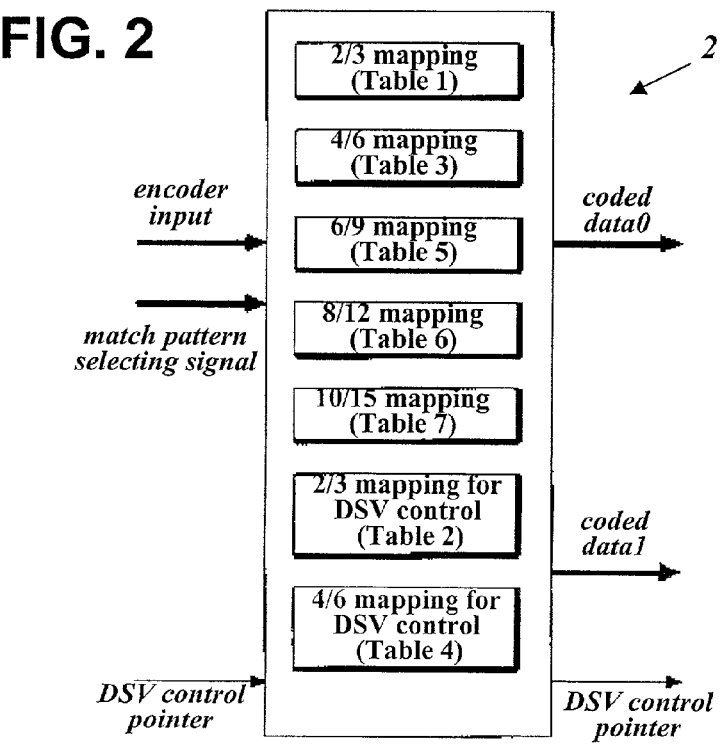
FIG. 2 is a detailed block diagram of an encoder shown in FIG. 1.

The encoder 2 determines, based on the match pattern selecting signal, which table to use to map a source data among the 2/3 mapping table 'Table 1', the 4/6 mapping table 'Table 3', the 6/9 mapping table 'Table 5', the 8/12 mapping table 'Table 6', and the 10/15 mapping table 'Table 7'. If the DSV control pointer is received from the encoding pattern detector/DSV control pointer generator 1, the encoder 2 uses Table 2 or 4 for controlling DSV to map a source data. For this modulation, the encoder 2, as shown in FIG. 2, contains look-up tables (LUTs) including the 2/3 mapping table 'Table 1', the 2/3 mapping table 'Table 2' for DSV control, the 4/6 mapping table 'Table 3', the 4/6 mapping table 'Table 4' for DSV control, the 6/9 mapping table 'Table 5', the 8/12 mapping table 'Table 6', and the 10/15 mapping table 'Table 7'.

If DSV control is needed, namely, the DSV control pointer is provided from the encoding pattern detector/DSV control pointer generator 1, the encoder 2 uses Table 2 or 4 to encode a source data. At the same time, the encoder 2 also encodes the source data using the 2/3 mapping table 'Table 1', the 4/6 mapping table 'Table 3', the 6/9 mapping table 'Table 5', the 8/12 mapping table 'Table 6', or the 10/15 mapping table 'Table 7'. The encoded data 'data0' based on Table 1, 3, 5, 6, or 7 is sent to the DSV controller 3 with the encoded data 'data1' based on Table 2 or 4 used for controlling DSV.

However, if DSV control is not necessary, namely, the DSV control pointer is not provided from the encoding pattern detector/DSV control pointer generator 1, the encoder 2 encodes a source data only once based on the 2/3 mapping table 'Table 1', the 4/6 mapping table 'Table 3', the 6/9 mapping table 'Table 5', the 8/12 mapping table 'Table 6', or the 10/15 mapping table 'Table 7'. In other words, the encoder 2 does not encode the source data based on Table 2 or 4 for DSV control.

Figure 3:
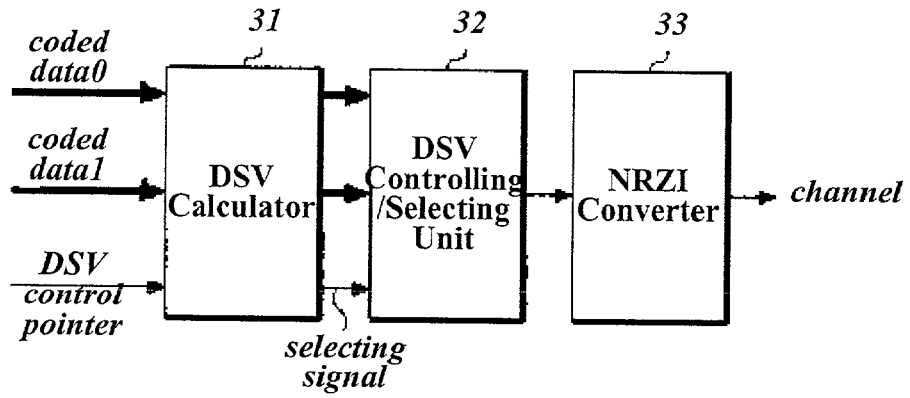
FIG. 3 is a detailed block diagram of a DSV controller shown in FIG. 1.

The DSV controller 3 calculates DSV bit by bit for every encoded data 'data0' and 'data1', and it selects one which has smaller DSV than the other if DSV control is needed. To conduct these operations, the DSV controller 3, as shown in FIG. 3, comprises a DSV calculator 31, a DSV controlling/selecting unit 32, and a NRZI converter 33 which are placed in serial between the encoder 2 and the channel. The DSV calculator 31 calculates DSV for both input data 'data0' and 'data1' bit by bit, and sends a selecting signal indicating encoded data of smaller DSV to the DSV controlling/selecting unit 32 together with both encoded data 'data0' and 'data1' in synchronization with the DSV control pointer from the encoder 2. The DSV controlling/selecting unit 32 chooses one encoded data 'data0' or 'data1' of smaller DSV in accordance with the selecting signal, and transmits the chosen encoded data to the NRZI converter 33. The NRZI converter 33 converts the received encoded data 'data0' or 'data1' to corresponding NRZI signal which will be recorded onto a writable disk in synchronization with a writing channel clock.

A demodulating device according to an embodiment of the present invention comprises a decoding pattern detector 4 and a decoder 5, as shown in FIG. 1, which are placed in series between an output line through which a train of decoded data is carried and the channel through which a channel bit stream is entered. The decoding pattern detector 4 stores a channel bit stream reproduced from a recording medium into a buffer (not shown). The decoding pattern detector 4 sends the stored channel bit stream composed of coded sequence to the decoder 5 and it also provides the decoder 5 with a match pattern selecting signal for each given coded word or sequence. The match pattern selecting signal is indicative of which table is used for de-mapping a given coded word or sequence among Tables 1 to 7.

Figure 4:
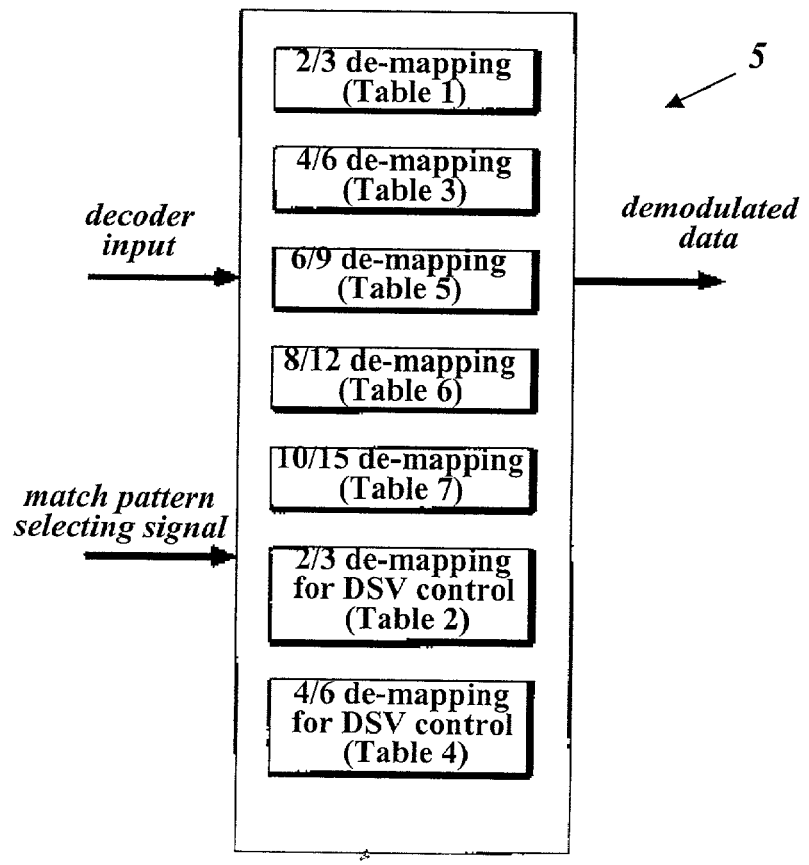
FIG. 4 is a detailed block diagram of a decoder shown in FIG. 1.

The decoder 5 chooses the 2/3 mapping table 'Table 1', the 4/6 mapping table 'Table 3', the 6/9 mapping table 'Table 5', the 8/12 mapping table 'Table 6', the 10/15 mapping table 'Table 7', the 2/3 mapping table 'Table 2' for DSV control, or the 4/6 mapping table 'Table 4' for DSV control in accordance with the match pattern selecting signal to de-map the coded word or sequence. To conduct this demodulation, the decoder 5 contains LUTs for de-mapping, including the 2/3 mapping table 'Table 1', the 4/6 mapping table 'Table 3', the 6/9 mapping table 'Table 5', the 8/12 mapping table 'Table 6', the 10/15 mapping table 'Table 7', the 2/3 mapping table 'Table 2' for DSV control, and the 4/6 mapping table 'Table 4' for DSV control, as shown in FIG. 4. The decoder 5 does not conduct DSV control operation such as an insertion of DSV control bit because the coded sequence has been modulated in consideration of DSV. Instead, it simply de-maps the coded word or sequence with reference to a selected table, e.g., Table 1, 2, 3, 4, 5, 6, or 7.

The above-explained data modulating/demodulating method and apparatus in accordance with the present invention can suppress low-frequency components without additional bits for suppressing low-frequency components because it maps a source data to coded data of low DSV in modulating process. As a result, DSV is maintained as low as it can without additional bits for DSV control, whereby jitter in reproduced signals is reduced, namely, stable reproduction is possible.

In addition, because the k factor in RLL constraints is relatively small, the stable clock restoration is possible, and modulation/demodulation algorithm is simple. Moreover, an additional DSV control circuit is not necessary, whereby complexity of hardware can be reduced remarkably.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of modulating a source data to be written onto an optical recording medium under the conditions of a given code rate and limited run length, comprising the steps of:
   (a) modulating the source data based on a first mapping table and modulating the same source data based on a second mapping table, the first mapping table containing coded data corresponding to the source data, the second mapping table containing at least one coded data, capable of suppressing low frequency components, which at least one source data among all source data contained in the first mapping table is mapped to, wherein the first mapping table includes a 2/3 sub-table containing 3-bit coded data for 2-bit source data, a 4/6 sub-table containing 6-bit coded data for 4-bit source data, a 6/9 sub-table containing 9-bit coded data for 6-bit source data, and a 8/12 sub-table containing 12-bit coded data for 8-bit source data; and
   (b) selecting one of the modulated data based on at least one condition among the conditions of: the value of a previous source data, the time when low-frequency suppression has been conducted, the value of subsequent modulated data, and whether or not RLL constraints are violated.

2. The method set forth in claim 1, wherein said step (b) comprises the steps of:
   calculating each digital sum value of the modulated data;
   choosing one of the two data modulated according to the first and the second mapping tables in response to a control signal for suppressing low-frequency components;
   converting the chosen modulated data to channel data matching the optical recording medium; and
   recording the channel data onto the optical recording medium.

3. The method set forth in claim 2, wherein the channel data has the run length ranging from 1 to 8.

4. The method set forth in claim 1, wherein the first mapping table further includes a 10/15 sub-table containing 15-bit coded data for 10-bit source data.

5. The method set forth in claim 1, wherein the second mapping table is composed of a 2/3 low-frequency suppressing sub-table in which at least one 3-bit low-frequency suppressing coded data is contained for at least one source data among all the source data contained in the 2/3 sub-table, and a 4/6 low-frequency suppressing sub-table in which at least one 6-bit low-frequency suppressing coded data is contained for at least one source data among all the source data contained in the 4/6 sub-table.

6. The method set forth in claim 1, further comprising the step of modulating a current source data using the first mapping table if the source data is modulated right before using one of the 6/9 sub-table and the 8/12 sub-table.

7. A method of demodulating a channel data written onto an optical recording medium, comprising the steps of:
   (a) reading a channel data from the optical recording medium, the channel data having been modulated from a source data using a table selected among a plurality of mapping tables based on at least one condition among the conditions of: the value of a previous source data, the time when low-frequency suppression has been conducted, the value of subsequent modulated data, and whether or not RLL constraints are violated; and
   (b) demodulating the read channel data using a plurality of de-mapping tables in which a decoded data corresponding to the channel data is contained, wherein the de-mapping tables include a 3/2 sub-table containing 2-bit source data for 3-bit coded data, a 6/4 sub-table containing 4-bit source data for 6-bit coded data, a 9/6 sub-table containing 6-bit source data for 9-bit coded data, and a 12/8 sub-table containing 8-bit source data for 12-bit coded data.

8. An apparatus of modulating a source data to be written onto an optical recording medium under the conditions of a given code rate and limited run length, comprising:
   a modulator modulating the source data based on a first mapping table and modulating the same source data based on a second mapping table, the first mapping table containing coded data corresponding to the source data, the second mapping table containing at least one coded data, capable of suppressing low frequency components, which at least one source data among all source data contained in the first mapping table is mapped to, wherein the first mapping table includes a 2/3 sub-table containing 3-bit coded data for 2-bit source data, a 4/6 sub-table containing 6-bit coded data for 4-bit source data, a 6/9 sub-table containing 9-bit coded data for 6-bit source data, and a 8/12 sub-table containing 12-bit coded data for 8-bit source data; and
   a controller selecting one of the modulated data based on at least one condition among the conditions of: the value of the source data, the time when low-frequency suppression has been conducted, the value of subsequent modulated data, and whether or not RLL constraints are violated.

9. The apparatus set forth in claim 8, further comprising:
   a pattern detecting/low-frequency suppressing control signal generating unit generating a pattern match signal indicating a mapping table for a given source data to control said modulator, and generating a low-frequency suppressing control signal to control said controller, the low-frequency suppressing control signal being indicative of the time when a low-frequency suppressing control is conducted.

10. The apparatus set forth in claim 9, wherein said controller comprises:
    a calculator each digital sum value of the modulated data;
    a selector choosing one of the two data modulated according to the first and the second mapping tables in response to a control signal for suppressing low-frequency components;
    a converter converting the chosen modulated data to channel data matching the optical recording medium; and
    a writing unit recording the channel data onto the optical recording medium.

11. The apparatus set forth in claim 10, wherein the channel data has the run length ranging from 1 to 8.

12. The apparatus set forth in claim 8, wherein the first mapping table further includes a 10/15 sub-table containing 15-bit coded data for 10-bit source data.

13. The apparatus set forth in claim 8, wherein the second mapping table is composed of a 2/3 low-frequency suppressing sub-table in which at least one 3-bit low-frequency suppressing coded data is contained for at least one source data among all the source data contained in the 2/3 sub-table, and a 4/6 low-frequency suppressing sub-table in which at least one 6-bit low-frequency suppressing coded data is contained for at least one source data among all the source data contained in the 4/6 sub-table.

14. An apparatus of demodulating a channel data written onto an optical recording medium, comprising:
- a detector reading a channel data from the optical recording medium, the channel data having been modulated from a source data using a table selected among a plurality of mapping tables; and
- a demodulator demodulating the read channel data using a plurality of de-mapping tables in which a decoded data corresponding to the channel data is contained, wherein the de-mapping tables include a 3/2 sub-table containing 2-bit source data for 3-bit coded data, a 6/4 sub-table containing 4-bit source data for 6-bit coded data, a 9/6 sub-table containing 6-bit source data for 9-bit coded data, and a 12/8 sub-table containing 8-bit source data for 12-bit coded data.

15. A method of modulating a source data to be written onto an optical recording medium under the conditions of a given code rate and limited run length, comprising the steps of:
   (a) modulating the source data to a coded data based on at least one mapping table, the mapping table including a 2/3 table containing 3-bit coded data for 2-bit source data, a 4/6 table containing 6-bit coded data for 4-bit source data, a 6/9 table containing 9-bit coded data for 6-bit source data, and an 8/12 table containing 12-bit coded data for 8-bit source data, wherein one of the tables is selected according to a bit sequence of the source data; and
   (b) recording the coded data onto the optical recording medium.

16. The method set forth in claim 15, wherein the given code rate is 2/3, and the step (a) modulates the source data to a coded data on the basis of the given code rate.

17. The method set forth in claim 16, wherein the coded data has the run length limited (RLL) (1,k) constraints, where k is an integer number greater than 1.

18. The method set forth in claim 17, wherein the modulated data has no merging bit to suppress a DC component.

19. The method set forth in claim 15, wherein in the step (a), the mapping table further includes a 2/3 low-frequency suppressing sub-table in which at least one 3-bit low-frequency suppressing coded data is contained for at least one source data among all the source data contained in the 2/3 table.

20. The method set forth in claim 15, wherein the step (a) modulates a current source data using the 2/3table if the source data is modulated right before using one of the 6/9 table and the 8/12 table.

21. The method set forth in claim 15, wherein in the step (a), the mapping table further includes a 4/6 low-frequency suppressing sub-table in which at least one 6-bit low-frequency suppressing coded data is contained for at least one source data among all the source data contained in the 4/6 table.

22. The method set forth in claim 15, wherein in the step (b), the coded data is converted into channel data and then recorded onto the optical recording medium.

23. A method of demodulating a coded data written onto an optical recording medium, comprising the steps of:
   (a) reading a coded data from the optical recording medium, the coded data having been modulated from a source data using a table selected among a plurality of mapping tables based on at least a bit sequence of the source data; and
   (b) demodulating the read coded data using a plurality of de-mapping tables, wherein the de-mapping tables includes a 3/2 table containing 2-bit source data for 3-bit coded data, a 6/4 table containing 4-bit source data for 6-bit coded data, a 9/6 table containing 6-bit source data for 9-bit coded data, and a 12/8 table containing 8-bit source data for 12-bit coded data.

24. The method set forth in claim 23, wherein the coded data has been modulated to a given code rate being 2/3.

25. The method set forth in claim 24, wherein the modulated data has no merging bit to suppress a DC component.

26. The method set forth in claim 23, wherein the coded data has a run length limited (RLL) (1,k) constraints, where k is an integer number greater than 1.

* * * * *